United States Patent
Patil et al.

(10) Patent No.: US 11,519,103 B2
(45) Date of Patent: Dec. 6, 2022

(54) PROCESS FOR PREPARING CARBON FIBERS

(71) Applicant: Reliance Industries Limited, Mumbai (IN)

(72) Inventors: Swanand Dilip Patil, Pune (IN); Rupesh Arun Khare, Pune (IN); Padmavathi Nandigam, Chagallu (IN); Asmita Ashok Khanvilkar, Ratnagiri (IN); Sreekumar Thaliyil Veedu, Kannur (IN)

(73) Assignee: Reliance Industries Limited, Mumbai (IN)

( * ) Notice: Subject to any disclaimer, the term of this patent is extended or adjusted under 35 U.S.C. 154(b) by 303 days.

(21) Appl. No.: 16/761,453

(22) PCT Filed: Nov. 2, 2018

(86) PCT No.: PCT/IB2018/058608
§ 371 (c)(1),
(2) Date: May 4, 2020

(87) PCT Pub. No.: WO2019/087137
PCT Pub. Date: May 9, 2019

(65) Prior Publication Data
US 2021/0172093 A1 Jun. 10, 2021

(30) Foreign Application Priority Data
Nov. 4, 2017 (IN) .............................. 201721015948

(51) Int. Cl.
| | |
|---|---|
| *D01F 9/145* | (2006.01) |
| *D01F 9/15* | (2006.01) |
| *C01B 32/05* | (2017.01) |
| *D01D 1/02* | (2006.01) |
| *D01F 1/10* | (2006.01) |
| *D01F 9/155* | (2006.01) |
| *C10C 3/00* | (2006.01) |

(52) U.S. Cl.
CPC ................ *D01F 9/15* (2013.01); *C01B 32/05* (2017.08); *C10C 3/002* (2013.01); *D01D 1/02* (2013.01); *D01F 1/10* (2013.01); *D01F 9/155* (2013.01); *C01P 2004/02* (2013.01); *C01P 2004/03* (2013.01)

(58) Field of Classification Search
CPC .. C10C 3/002; D01D 1/02; D01F 1/10; D01F 9/145; D01F 9/15; D01F 9/155
USPC ......... 264/29.2, 29.6, 211; 423/447.1, 447.7; 208/39, 40
See application file for complete search history.

(56) References Cited

U.S. PATENT DOCUMENTS

| | | | | |
|---|---|---|---|---|
| 4,014,725 | A | * 3/1977 | Schulz | ...................... D01F 9/15 264/29.2 X |
| 2013/0149522 | A1* | 6/2013 | Tsotsis | ................... D01F 9/145 428/297.4 |

FOREIGN PATENT DOCUMENTS

| | | | |
|---|---|---|---|
| CN | 102634873 A | 8/2012 | |
| CN | 106567157 A | 4/2017 | |
| CN | 105152674 B | * 6/2017 | ............. C04B 35/83 |

OTHER PUBLICATIONS

Translation of CN 105152674 B (published on Jun. 16, 2017.*
International Search Report issued in International Application No. PCT/IB2018/058608 dated Jan. 16, 2019 (2 pages).
Written Opinion issued in International Application No. PCT/IB2018/058608 dated Jan. 16, 2019 (6 pages).
Andrews, R. et al. "Nanotube composite carbon fibers" Appl. Phys. Lett. 75, 1329 (1999); doi: 10.1063/1.124683 (3 pages).

* cited by examiner

*Primary Examiner* — Leo B Tentoni
(74) *Attorney, Agent, or Firm* — Osha Bergman Watanabe & Burton LLP

(57) ABSTRACT

The present disclosure relates to a process for preparing carbon fibers. The process involves blending a carbon nanomaterial with a carbon material to obtain a homogenous blend, heating the homogenous blend to obtain mesophase pitch having particles with reduced mesophase sphere size followed by spinning the mesophase pitch to obtain the pitch fibers. The pitch fibers are then carbonized to obtain the carbon fibers. The carbon fibers prepared by the process of the present disclosure have improved tensile properties as compared to the conventional pitch based carbon fibers.

11 Claims, 9 Drawing Sheets

PROCESS FOR PREPARING CARBON FIBERS

FIELD

The present disclosure relates to a process for preparing carbon fibers.

DEFINITIONS

As used in the present disclosure, the following terms are generally intended to have the meaning as set forth below, except to the extent that the context in which they are used indicates otherwise.

Carbon fibers: The term "carbon fibers" also known as graphite fibers, are fibers about 5-10 micrometres in diameter and composed mostly of carbon atoms. These fibers are extremely stiff, strong, light, and are used in a wide range of applications.

Carbon Pitch: The term "carbon pitch" refers to a viscoelastic material that is composed of aromatic hydrocarbons. Carbon pitch is produced via the distillation of carbon-based materials, such as plants, crude oil, and coal.

Isotropic Pitch: The term "isotropic pitch" refers to the homogeneous pitch that has the same properties along all directions. Pitch is a viscoelastic material composed of aromatic hydrocarbons, and is produced by the distillation of carbon-based materials.

Mesophase Pitch: The term "mesophase pitch" refers to the pitch obtained from the heating of isotropic pitch. Mesophase pitch is made by polymerizing isotropic pitch to a higher molecular weight. The mesophase pitch forms a thermotropic crystal, which allows the pitch to become organized and form linear chains without the use of tension.

Mesophase sphere size: Mesophase sphere is the morphology of carbonaceous mesophase which is formed from the isotropic pitch. The spherical carbonaceous mesophase usually has a lamellar structure consisting of flat aromatic molecules arranged in parallel layers which are perpendicular to the sphere/isotropic phase interface. On coalescence, this spherical mesophase loses its characteristic morphology and is converted to the bulk mesophase. The term "mesophase sphere size" refers to the dimension of the mesophase spheres that are obtained during the formation of the mesophase pitch.

Carbonization: The term "carbonization" refers to the removal of all non-organic material from a substance.

BACKGROUND

The background information herein below relates to the present disclosure but is not necessarily prior art.

Conventionally, carbon fibers are produced from Polyacrylonitrile (PAN) precursor and pitch based precursor. Recently, lignin, polyethylene, and cellulose have been used as a precursor for the production of carbon fibers. PAN based carbon fibers show excellent tensile strength, however the raw material is expensive and therefore there is an increase in the cost of carbon fibers. Further, PAN based carbon fibers provide a low carbon yield in the range of 40% to 45% which is not economical.

An alternative to PAN is carbon pitch, which is comparatively inexpensive. Two forms of carbon pitch, namely isotropic pitch and mesophase pitch can be used for the preparation of carbon fibers. However, carbon fibers prepared from isotropic pitch exhibit lower tensile strength as well as lower tensile modulus. Though the carbon fibers prepared from mesophase pitch exhibit high tensile modulus and strength as compared to isotropic pitch based carbon fibers, yet their tensile strength is lower than to industrially preferred PAN based carbon fibers.

Therefore, there is felt a need to provide an alternative process for preparing carbon fibers that mitigates the drawbacks mentioned hereinabove.

OBJECTS

Some of the objects of the present disclosure, which at least one embodiment herein satisfies, are as follows:

An object of the present disclosure is to ameliorate one or more problems of the prior art or to at least provide a useful alternative.

Another object of the present disclosure is to provide a process for preparing carbon fibers.

Still another object of the present disclosure is to provide a simple and cost effective process for the preparation of carbon fibers.

Other objects and advantages of the present disclosure will be more apparent from the following description, which is not intended to limit the scope of the present disclosure.

SUMMARY

The present disclosure provides a process for the preparation of carbon fibers. The process comprises blending a carbon nanomaterial and a carbon material to obtain a homogenous blend. The homogenous blend is then heated at a first pre-determined temperature under an inert atmosphere to obtain mesophase pitch having particles with reduced mesophase sphere size. The mesophase pitch is spun, to obtain the pitch fibers, which are then carbonized at a second pre-determined temperature to obtain carbon fibers.

BRIEF DESCRIPTION OF THE ACCOMPANYING DRAWING

The present disclosure will now be described with the help of the accompanying drawing, in which.

DETAILED DESCRIPTION

Figure 1A:
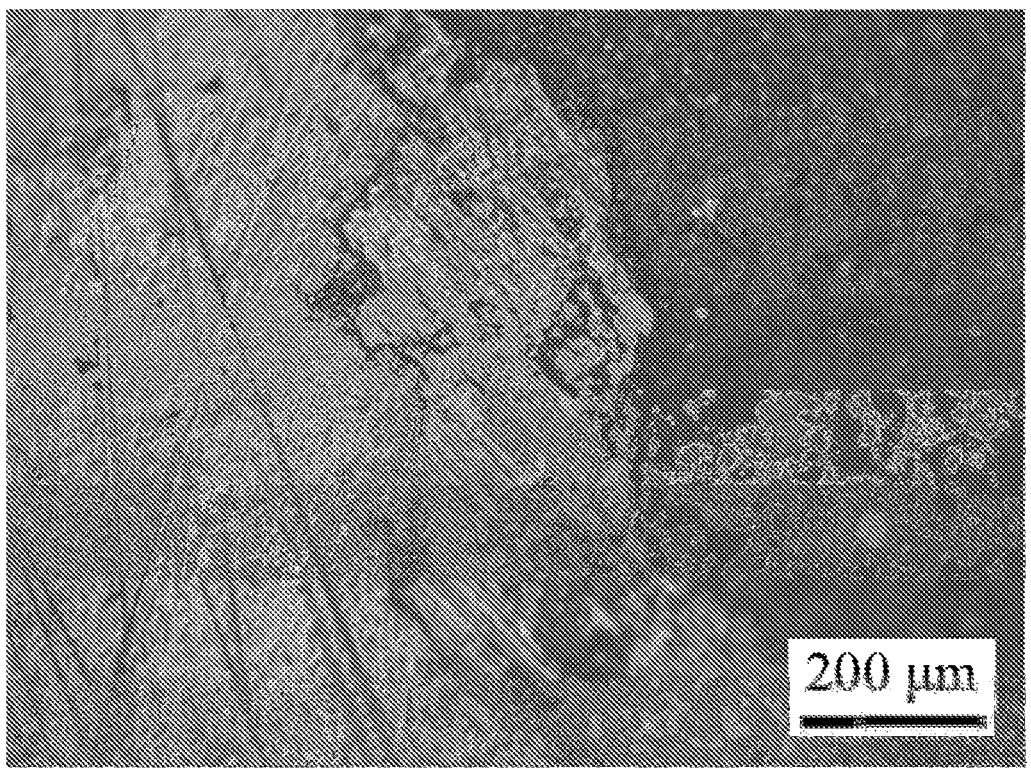
FIG. 1A illustrates a polarized optical microscope image of mesophase pitch obtained without the addition of carbon nanotubes after 3 hours of processing.
Figure 1B:
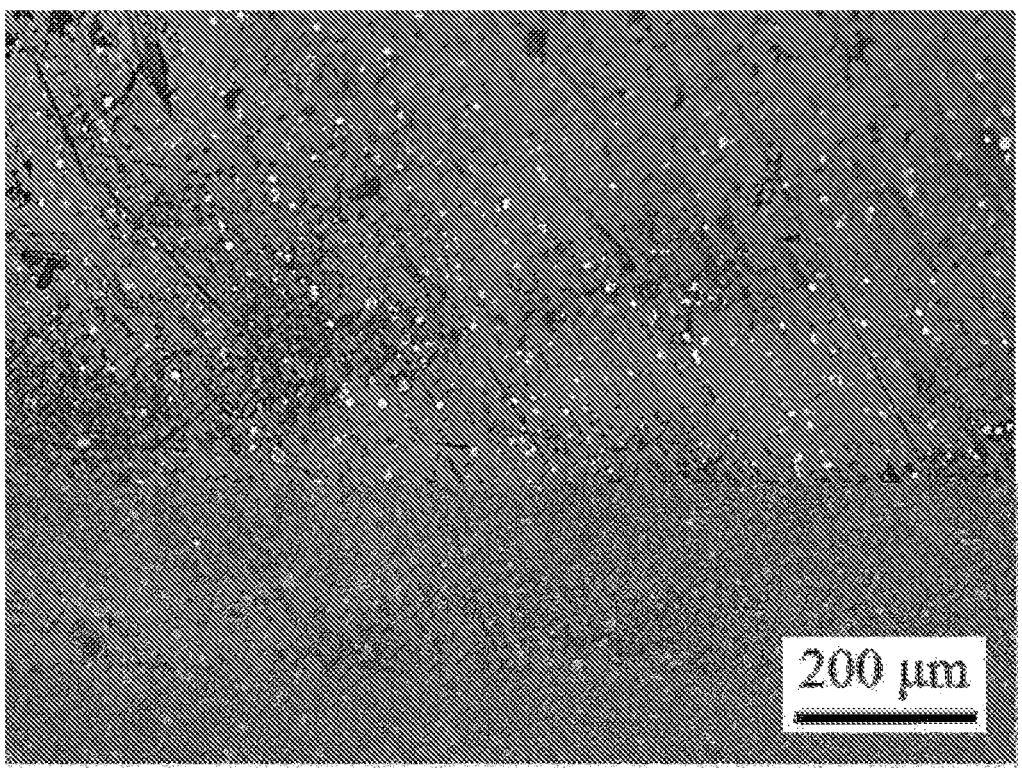
FIG. 1B illustrates a polarized optical microscope image of mesophase pitch obtained with the addition of 0.5 wt % carbon nanotubes after 3 hours of processing.
Figure 1C:
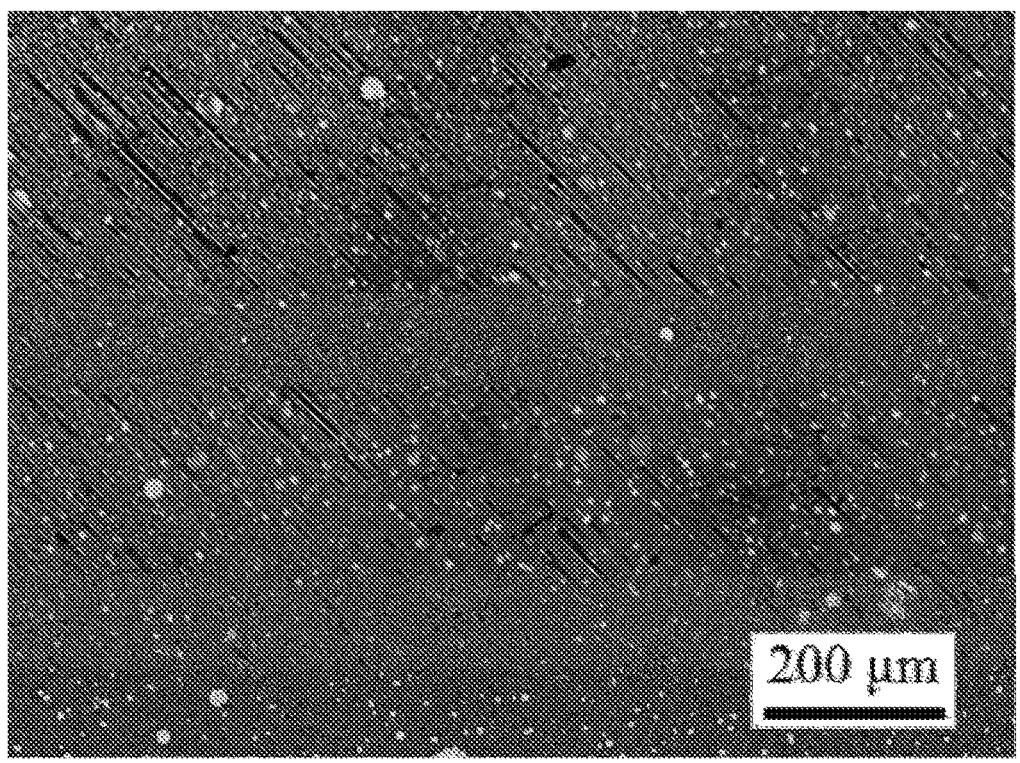
FIG. 1C illustrates a polarized optical microscope image of mesophase pitch obtained with the addition of 1 wt % carbon nanotubes after 3 hours of processing.

Embodiments, of the present disclosure, will now be described with reference to the accompanying drawing.

Embodiments are provided so as to thoroughly and fully convey the scope of the present disclosure to the person skilled in the art. Numerous details, are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise.

The terms "comprises," "comprising," "including," and "having," are open ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

As used herein, the term "and/or" includes any and all combinations of one or more of the associated listed elements.

The terms first, second, third, etc., should not be construed to limit the scope of the present disclosure as the aforementioned terms may be only used to distinguish one element, component, region, layer or section from another component, region, layer or section. Terms such as first, second, third etc., when used herein do not imply a specific sequence or order unless clearly suggested by the present disclosure.

Conventionally, carbon fibers are produced from Polyacrylonitrile (PAN) precursor and pitch based precursor. Recently, lignin, polyethylene, and cellulose have been used as a precursor for the production of carbon fibers. PAN based carbon fibers show excellent tensile strength, however the raw material is expensive and therefore increases the production cost of carbon fibers. Further, PAN based carbon fibers provide a carbon yield in the range of 40% to 45%, further adding to the processing cost.

An alternative to PAN is carbon pitch, which is comparatively inexpensive, provides a higher carbon yield and can be spun by melting. Two forms of carbon pitch, namely isotropic pitch and mesophase pitch can be used for the preparation of carbon fibers. However, carbon fibers prepared from isotropic pitch exhibit lower tensile strength as well as lower tensile modulus as compared to the PAN-based carbon fibres due to the larger size of their crystallites with highly aligned graphitic layers. Though the carbon fibers prepared from mesophase pitch exhibit high tensile modulus and strength as compared to isotropic pitch based carbon fibers, yet their tensile strength is lower than to industrially preferred PAN based carbon fibers.

Attempts made to improve the tensile strength of pitch based carbon fibers include randomization of the graphitic layers by changing the flow properties through alteration of viscosity, capillary/die/spinneret design or by agitating the feed in the spinneret. More recently, mutliwalled carbon nanotubes were mixed in the mesophase pitch precursor to improve the tensile strength of pitch. However, it is observed that this leads to the randomization of the graphitic structures, but the tensile properties of the produced carbon fibers are inferior as compared to fibers without the addition of CNTs. It is suggested that the disturbance in the alignment of these graphitic layers resulted in fibers with lower tensile modulus however, no explanation regarding lower strength of carbon fibers could be found.

Though, pitch-based carbon fibers exhibit exceptionally higher tensile modulus, high electrical conductivity, thermal conductivity, and negative coefficient of linear thermal expansion, however their tensile strength is lower than that of PAN based carbon fibers mainly due to the larger size of their crystallites with highly aligned graphitic layers.

Due to the low tensile strength, use of pitch based carbon fibers has been very limited (only 10% of the overall carbon fiber market) for the applications with requirement of high modulus fibers and high thermal conductivity.

The present disclosure envisages a process for preparing a mesophase pitch from a carbon material, such as clarified slurry oil (CSO) or isotropic pitch with a reduced mesophase size and randomization of the graphitic layers in the mesophase via incorporation of carbon nanomaterials in the mesophase pitch synthesis process. The tensile strength of the mesophase pitch based carbon fiber can be improved by controlling the microstructure of the synthesized mesophase. The addition of carbon nanomaterials, such as CNTs, and graphene can help in randomization of the layers of graphitic structures in the fiber, and reduce the mesophase sphere size to improve the tensile properties of the pitch-based carbon fibers.

In an aspect of the present disclosure, there is provided a process for preparing carbon fibers. The process involves a step of blending a carbon nanomaterial and a carbon material to obtain a homogenous blend, which is then heated at a first pre-determined temperature under an inert atmosphere to obtain mesophase pitch. The so obtained mesophase pitch has particles with reduced mesophase sphere size. Further, the so obtained mesophase pitch is initially spun into pitch fibers (precursor fibres), which are then converted into carbon fibers by carbonization process at a second perdetermined temperature. The process is hereinafter described in detail.

Initially, a carbon nanomaterial is blended with a carbon material to obtain a homogenous blend.

Typically, the carbon material can be selected from clarified slurry oil, coal tar pitch, naptha cracked oil and isotropic pitch.

The carbon nanomaterial can be selected from the group consisting of carbon nanotubes, graphene and crumpled graphene.

In an exemplary embodiment, the carbon material can be isotropic pitch and the carbon nanomaterial can be carbon nanotubes.

The weight ratio of the carbon nanomaterial to the carbon material can be in the range of 0.001 to 0.05.

Typically, the carbon nanomaterials are uniformly blended with the carbon material by suitable techniques, such as ultra-sonication, and high shear mixing. In an embodiment, the homogenous blend is continuously stirred to ensure uniform mixing.

In an embodiment, the carbon nanomaterials can be dispersed in a fluid medium, prior to blending the carbon nanomaterial with the carbon material. The fluid medium can be selected from the group consisting of 1,2-dichlorobenzene (DCB), N-methyl-pyrrolidone (NMP), and dimethylformamide (DMF). Typically, a surfactant, can be used for aiding the dispersion of the carbon nanomaterials in the fluid medium. The surfactant can be selected from sodium dodecyl benzene sulfonate (SDBS), and polyvinylpyrrolidone (PVP). Typically, the weight ratio of the carbon nanomaterial to the surfactant can be in the range of 1:5 to 1:15.

In accordance with the embodiments of the present disclosure, the dispersion can be carried out by known techniques, such as mechanical dispersion (ultra-sonication), and high shear mixing followed by incorporating the dispersed carbon nanomaterial into the carbon material.

In the next step, the homogenous blend is heated at a first pre-determined temperature under inert atmosphere to obtain a mesophase pitch having particles with reduced mesophase sphere size.

Typically, the first pre-determined temperature can be in the range of 350° C. to 450° C.

The mesophase pitch is then spun to obtain pitch fibers.

The mesophase pitch is cooled to ambient temperature under flowing nitrogen gas before the spinning step. Mesophase pitch is melt spun using a single screw extruder, at a melt temperature in the range of 250° C. to 380° C.

The pitch fibers are then carbonized at a second pre-determined temperature under an inert atmosphere to obtain the carbon fibers. In an embodiment, the pitch fibers are stabilized at a temperature in the range of 200° C. to 350° C. for a time period in the range of 1 hour to 10 hours in air atmosphere to obtain stabilized pitch fibers, before the carbonization step. Stabilization of the pitch fibers makes them infusible and prevents them from melting and sticking to each other during the carbonization step involving heating of the fibers to high temperature. Typically, the stabilization is carried out in sequential steps by gradually increasing the temperature. Uniform dispersion of the carbon nanomaterial in the carbon material is carried out to ensure that the fibers obtained have the required properties and for proper spinning of the obtained fibers.

The stabilized fibers are then gradually cooled to ambient temperature and then carbonized by heating the pitch fibers to the second pre-determined temperature in inert atmosphere. The second pre-determined temperature can be in the range of 900° C. to 1500° C. Typically, the carbonization step involves, heating the stabilized pitch fibers to a temperature for a time period in the range of 1 hour to 3 hours, and further maintaining the pitch fibers at the same temperature for a time period in the range of 1 minute to 5 minutes to obtain the carbon fibers.

The process of the present disclosure can aid in restricting the size of the growing mesophase spheres in addition to the randomization of the graphitic layers. Further, the nanomaterials may aid in stress transfer to increase the tensile strength of the carbon fibers.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

The present disclosure is further described in light of the following experiments which are set forth for illustration purpose only and not to be construed for limiting the scope of the disclosure. The following experiments can be scaled up to industrial/commercial scale and the results obtained can be extrapolated to industrial scale.

EXPERIMENTAL DETAILS

Experiment-1: Preparation of Carbon Fibers in Accordance with the Present Disclosure Step-I: Preparation of the Homogenous Blend CNTs were dispersed in DMF using PVP (Polyvinylpyrrolidone) as a surfactant. Concentration of CNTs in DMF was maintained at 0.5 g/100 mL DMF. Weight ratio of CNT:PVP was maintained at 1:10. CNT dispersion was achieved by ultra-sonication of the mixture for 4 hours at room temperature. The CNT dispersed in DMF was then transferred to a distillation apparatus, mixed with isotropic pitch using mechanical stirrer and DMF to obtain a homogenous blend. CNT dispersion was added to achieve CNT loadings of 0.35, 0.5 and 1.0 wt % of CNT loading in the final mesophase pitch samples.

Step-II: Preparation of the Mesophase Pitch from the Homogenous Blend

Mesophase pitch was synthesized by thermal distillation process under nitrogen atmosphere. The homogenous blend obtained in Step-I was heated above 160° C. to first remove DMF and then continued heating to 390° C. and maintained at 390° C. for a predetermined time (9 hours, 12 hours, 15 hours) under flowing nitrogen gas. The pitch was stirred continuously by mechanical stirrer to ensure uniform mixing. After the reaction was carried out for 15 hours, the heating was stopped and the product was allowed to cool to room temperature under flowing nitrogen gas.

Step-III: Preparation of Pitch Fiber from the Mesophase Pitch

Pitch fiber was made by melt spinning the mesophase pitch obtained in Step-II, using a single screw extruder attached with a die with 24 holes spinneret plate having 0.3 mm diameter holes. The melt temperature for extrusion was maintained at 350° C. and the fiber was wound on a steel drum with 150 mm diameter at 100 rpm speed.

Step-IV: Preparation of Carbon Fibers from the Pitch Fibers

Pitch fibers obtained in Step-III were stabilized in air circulated oven at 240° C. for 2 hours, then at 280° C. for 2 hours and then at 330° C. for 3 hours. The stabilized fibers were then cooled to room temperature over a period of 3 hours. Stabilized fibers were then carbonized in nitrogen atmosphere by heating the stabilized fibers from room temperature to 1200° C. in 2 hours and then by holding at 1200° C. for 5 minutes.

The mesophase pitch was prepared with and without the addition of CNTs to determine the effect of CNTs on the formation of mesophase pitches, and the results obtained are provided in FIGS. 1 to 5. FIGS. 1A, 1B, and 1C illustrate the polarized optical microscope image of the samples taken from the reaction vessel after 3 hours. It is clearly seen that the addition of CNTs helped in the faster formation of the mesophase as compared to when CNTs were not used (FIG. 1A). Further, the amount of mesophase pitch obtained was higher (Figure-1C) when 1 wt % CNTs were used as compared to when 0.5 wt % of CNTs (Figure-1B) were used.

Figure 2A:
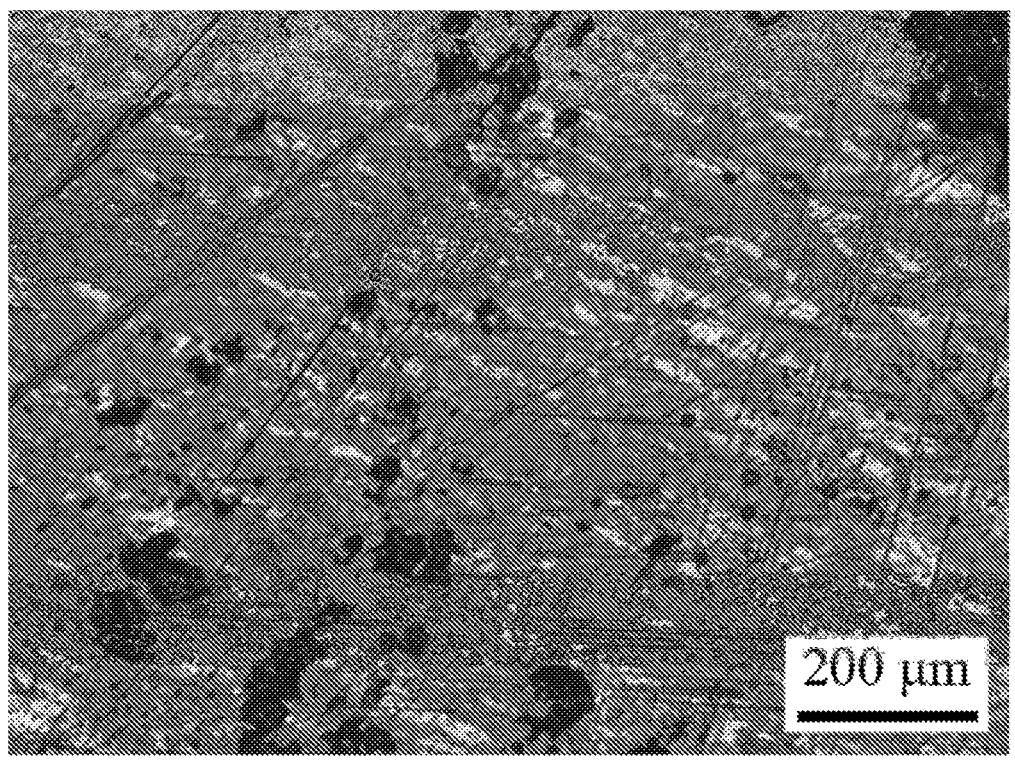
FIG. 2A illustrates a continuous mesophase structure obtained without the addition of carbon nanotubes after 15 hours of processing.
Figure 2B:
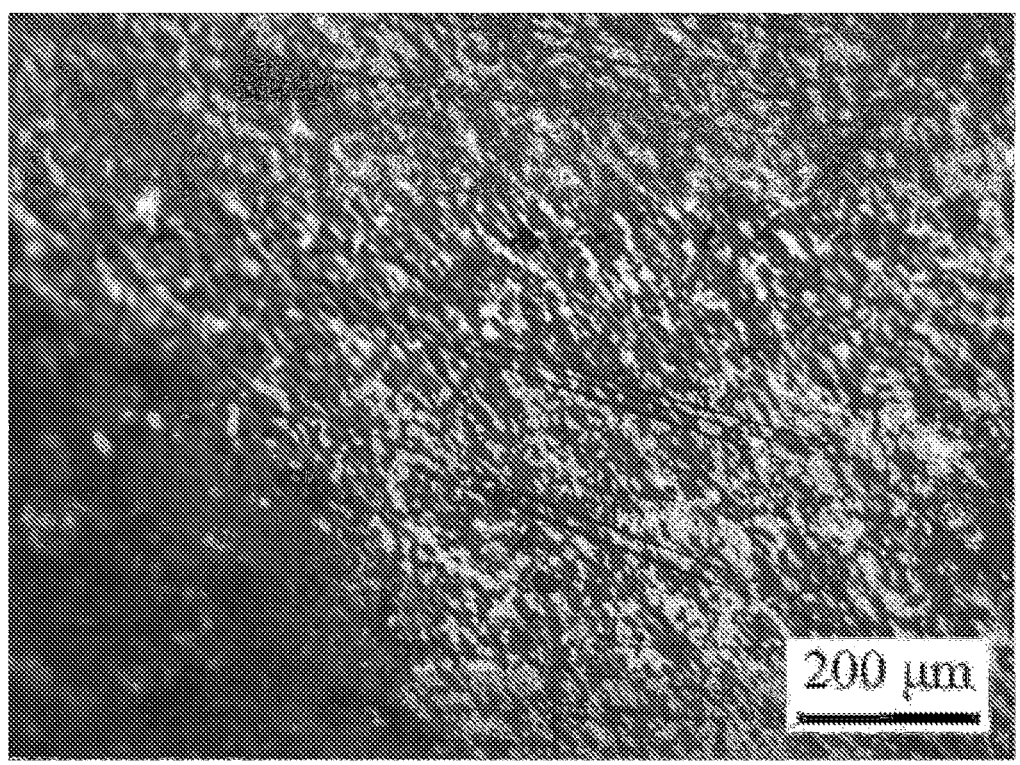
FIG. 2B illustrates a continuous mesophase structure obtained with the addition of 0.5 wt % carbon nanotubes after 12 hours of processing.
Figure 2C:
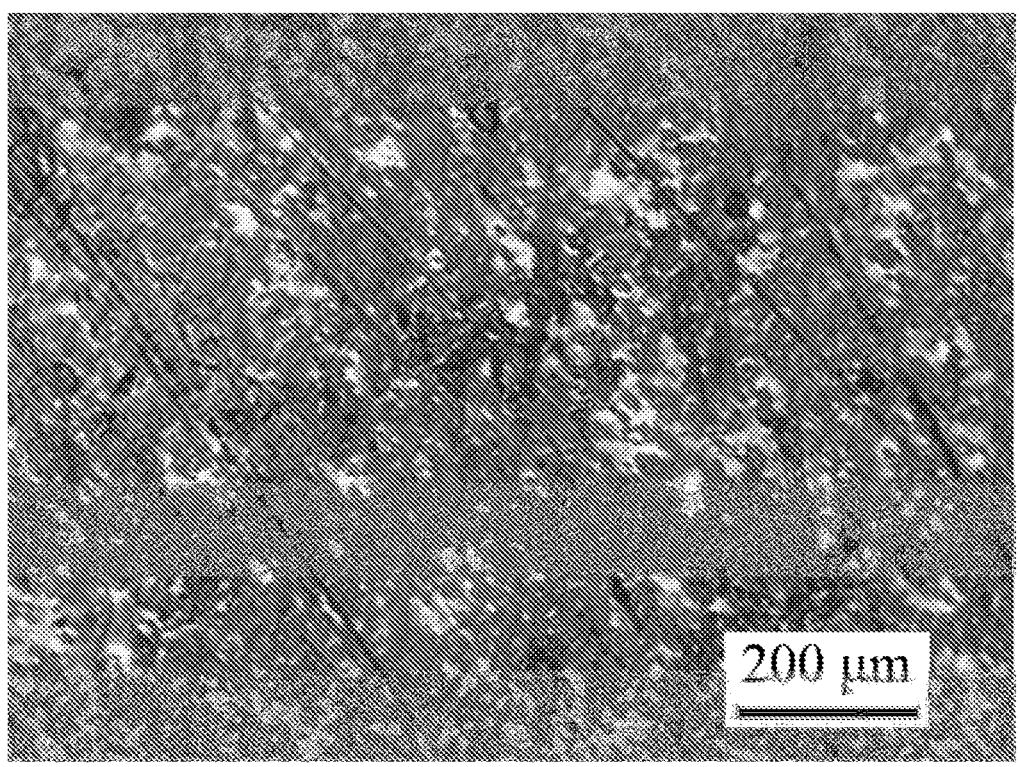
FIG. 2C illustrates a continuous mesophase structure obtained with the addition of 1 wt % carbon nanotubes after 9 hours of processing.

A continuous mesophase structure was obtained after 9 hours (1 wt % CNTs) to 12 hours (0.5 wt % CNTs) in case of samples using CNTs while the process without CNTs required 15 hours to obtain the continuous mesophase formation. FIGS. 2A, 2B, and 2C illustrate that continuous mesophase structure obtained in all three cases. It was observed that the mesophase size is small in case of samples with CNTs (FIGS. 2B and 2C) as compared to that without CNTs [FIG. 2A].

Figure 3:
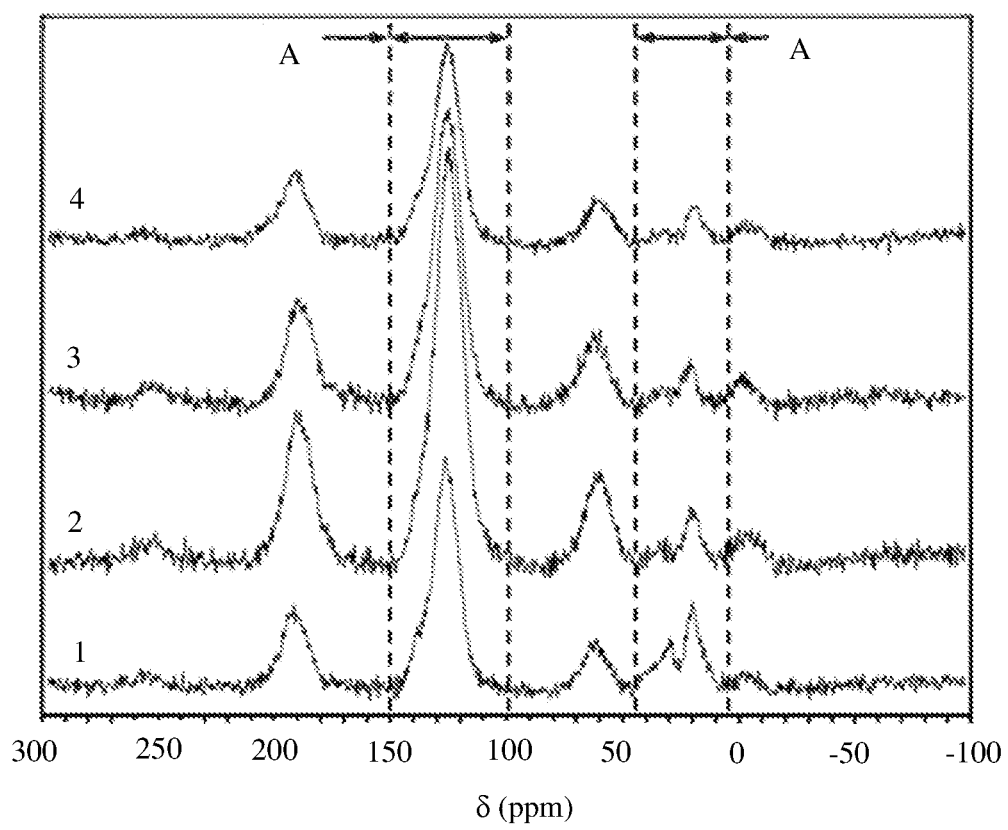
FIG. 3 illustrates an NMR spectrum of the starting pitch and mesophase pitch obtained without and with addition of carbon nanotubes.

FIG. 3 illustrates the NMR spectra of different pitch samples, wherein (1) represents starting isotropic pitch, (2) represents mesophase pitch without CNTs [process time: 15 hours], (3) represents mesophase pitch with 0.5 wt % CNTs [process time: 12 hours], and (4) represents mesophase pitch with 1 wt % CNTs [process time: 9 hours]. The aliphatic and aromatic carbon content in all the samples was evaluated from the peaks indicated in their respective zones as illustrated in FIG. 3 and the percentages are summarized in Table-1 below.

TABLE-1

Quantity of aromatic and aliphatic carbon content present in starting pitch and mesophase pitch

| Sample No. | Pitch sample | Aromatic carbon content (%) | Aliphatic carbon content (%) |
|---|---|---|---|
| (i) | Starting isotropic pitch | 76.56 | 23.44 |
| (ii) | Mesophase pitch without CNTs | 94.51 | 5.49 |
| (iii) | Mesophase Pitch with 0.5 wt % CNTs | 96.00 | 4.00 |
| (iv) | Mesophase Pitch with 1 wt % CNTs | 91.62 | 8.38 |

Table-1 provides the quantity of aliphatic and aromatic carbon content present in the starting pitch and mesophase pitch obtained without and with the addition of carbon nanotubes as evaluated from the NMR spectra illustrated in FIG. 3. It is seen that in all the mesophase samples, the aromatic content was more than 90% indicating similarity in the chemical composition of the synthesized mesophase pitch.

Figure 4:
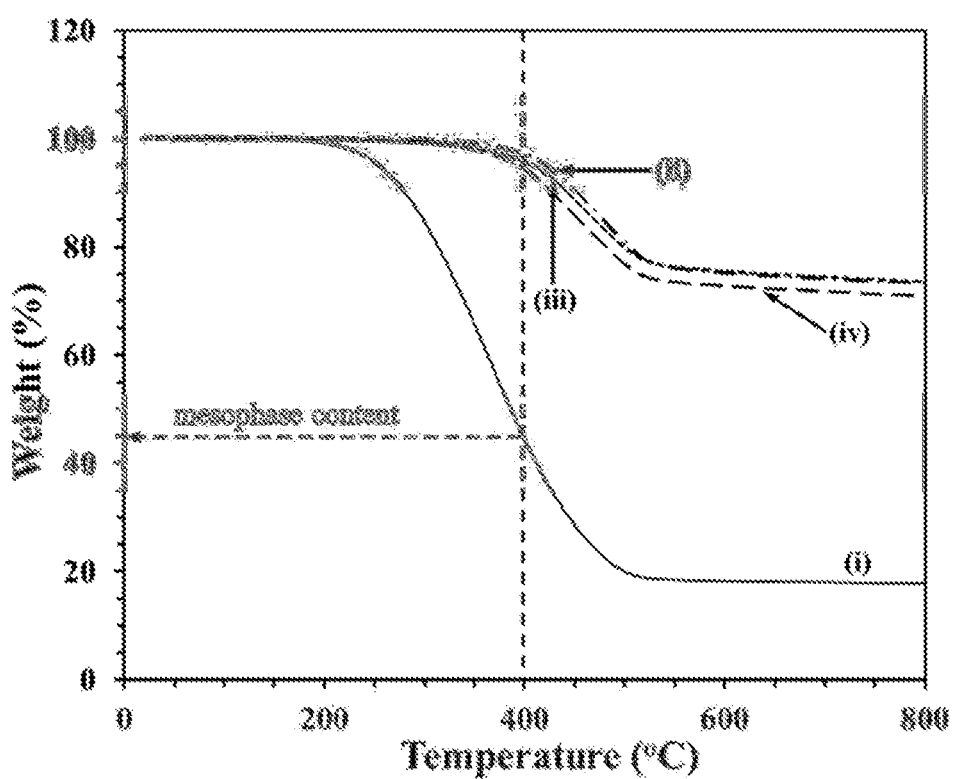
FIG. 4 illustrates the thermogravimetric (TGA) data of the starting pitch and mesophase pitch obtained without and with addition of carbon nanotubes.

Similarly, FIG. 4 illustrates the thermogravimetric analysis (TGA) of all the samples, wherein (i) represents starting isotropic pitch, (ii) represents mesophase pitch without CNTs, (iii) represents mesophase pitch with 0.5 wt % CNTs, and (iv) represents mesophase pitch with 1 wt % CNTs. Table-2 summarizes the mesophase content present in them, evaluated from the residual weight at 400° C.

TABLE-2

Quantity of mesophase content and total carbon content in starting pitch and mesophase pitch

| Sample No. | Pitch sample | Mesophase content (%) | Total carbon yield (%) |
|---|---|---|---|
| (i) | Starting isotropic pitch | 45 | 17.90 |
| (ii) | Mesophase pitch w/o CNTs | 97.4 | 73.39 |
| (iii) | Mesophase Pitch with 0.5 wt % CNTs | 97.36 | 74.07% |
| (iv) | Mesophase Pitch with 1 wt % CNTs | 94.69 | 71.24% |

Table-2 provides the mesophase content and total carbon content in the starting pitch and mesophase pitch obtained without and with the addition of carbon nanotubes as evaluated from TGA data given in FIG. 4. It is seen from FIG. 4 and Table-2 that all the mesophase samples had comparative mesophase content.

Thus, from FIGS. 3 and 4 along with the analysis provided in Tables 1 and 2, respectively, it is clearly seen that while the mesophase formation was faster when synthesized using CNTs, all the synthesized mesophase pitches were chemically comparable.

Figure 5A:
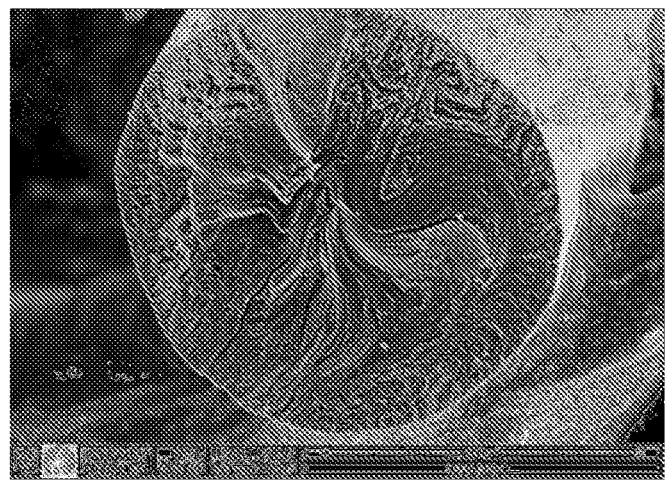
FIG. 5A illustrates the scanning electron microscope image of a cross-section of carbon fibers made using mesophase pitch without addition of CNTs.
Figure 5B:
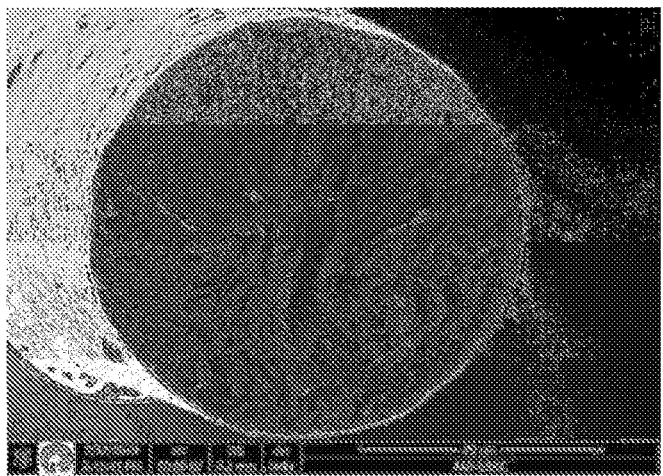
FIG. 5B illustrates the scanning electron microscope (SEM) image of a cross-section of carbon fibers made using mesophase pitch with 0.35 wt % of CNTs.

FIG. 5A and FIG. 5B illustrate the scanning electron microscope image of a cross-section of carbon fibers made using mesophase pitch without addition of CNTs, and with 0.35 wt % of CNTs, respectively. Table-3 summarizes the tensile properties of the carbon fibers made using mesophase pitch without addition of CNTs, and with 0.35 wt % of CNTs. The figures clearly show improved tensile strength for the carbon fiber made by addition of CNTs. The improvement in strength of the carbon fiber made with CNTs can be attributed to the random, compact microstructure of the graphitic layers. The relatively lower tensile strength for the carbon fiber without CNTs can be attributed to the radial microstructure of the graphitic layers with axial cracks. Thus, the tensile properties of the pitch based carbon fiber are improved by addition of CNTs in the mesophase pitch synthesis process. The improvement in the strength of the fiber is due to the formation of compact and random microstructure of the formed graphitic layers.

It is noted that the tensile properties of carbon fibers are highly dependent on the fiber diameter. It is known that the tensile properties of carbon fibers improve with decrease in the fiber diameter. Thus, it is expected that the tensile properties of the carbon fibers will improve further by achieving carbon fibers of 10-15 μm diameter.

TABLE-3

Comparison of tensile properties of carbon fiber prepared without addition of CNTs, and with 0.35 wt % of CNTs

| Sr. No. | Pitch sample | Fiber Diameter (μm) | Tensile Strength (MPa) | Tensile Modulus (GPa) | Strain at Failure (%) |
|---|---|---|---|---|---|
| (i) | Carbon fiber w/o CNTs | 31 ± 2 | 305 ± 58 | 75 ± 12 | 0.41 ± 0.06 |
| (ii) | Carbon Fiber with 0.35 wt % CNTs | 32 ± 3 | 326 ± 67 | 69 ± 7 | 0.48 ± 0.11 |

The present disclosure provides a process to modify the structure of the mesophase pitch which results in improved tensile strength of the mesophase-based carbon fibers. Incorporation of carbon nanomaterials, such as CNTs or graphene can help in randomization of the layers of graphitic structures in the fiber, and reduce the mesophase sphere size to help improve the tensile properties of the pitch-based carbon fibers. Incorporation of carbon nanomaterials, such as CNTs or graphene can also reduce the process time required for mesophase formation.

Technical Advancements

The present disclosure described herein above has several technical advantages including, but not limited to, the realization of carbon fibers having improved tensile strength.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results. While certain embodiments of the inventions have been described, these embodiments have been presented by way of example only, and are not intended to limit the scope of the inventions. Variations or modifications to the formulation of this invention, within the scope of the invention, may occur to those skilled in the art upon reviewing the disclosure herein. Such variations or modifications are well within the spirit of this invention.

The numerical values given for various physical parameters, dimensions and quantities are only approximate values and it is envisaged that the values higher than the numerical value assigned to the physical parameters, dimensions and quantities fall within the scope of the invention unless there is a statement in the specification to the contrary.

While considerable emphasis has been placed herein on the specific features of the preferred embodiment, it will be appreciated that many additional features can be added and that many changes can be made in the preferred embodiment without departing from the principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

What is claimed is:

1. A process for preparing carbon fibers, said process comprising the following steps:
   blending a carbon nanomaterial and a carbon material to obtain a homogenous blend wherein said carbon nanomaterial is dispersed in a fluid medium prior to being blended with said carbon material;
   heating said homogenous blend at a first pre-determined temperature under inert atmosphere to obtain a mesophase pitch having particles with reduced mesophase sphere size;
   spinning said mesophase pitch to obtain pitch fibers; and
   carbonizing said pitch fibers at a second pre-determined temperature under inert atmosphere to obtain carbon fibers.

2. The process as claimed in claim 1, wherein said carbon material is selected from clarified slurry oil, coal tar pitch, naptha cracked oil and isotropic pitch.

3. The process as claimed in claim 1, wherein said carbon nanomaterial is selected from the group consisting of carbon nanotubes, graphene and crumpled graphene.

4. The process as claimed in claim 1, wherein the weight ratio of said carbon nanomaterial to said carbon material is in the range of 0.001 to 0.05.

5. The process as claimed in claim 1, wherein said fluid medium is selected from the group consisting of 1,2-dichlorobenzene, N-methyl-pyrrolidone, and dimethylformamide.

6. The process as claimed in claim 1, wherein said carbon nanomaterial is dispersed in said fluid medium using a surfactant to aid dispersion of the carbon nanomaterial.

7. The process as claimed in claim 6, wherein said surfactant is selected from sodium dodecyl benzene sulfonate, and polyvinylpyrrolidone.

8. The process as claimed in claim 6, wherein the weight ratio of said carbon nanomaterial to said surfactant is in the range of 1:5 to 1:15.

9. The process as claimed in claim 1, wherein first pre-determined temperature is in the range of 350° C. to 450° C., and said second pre-determined temperature is in the range of 900° C. to 1500° C.

10. The process as claimed in claim 1, wherein the amount of said carbon nanomaterial in said carbon fiber is in the range of 0.1 wt % to 5 wt %.

11. The process as claimed in claim 1, wherein said blending is carried out by a method selected from ultrasonication and high shear mixing.

* * * * *